Nov. 15, 1966 FUMIYUKI INOSE 3,286,153
CONVERTER SYSTEM FOR ELIMINATING
COMMON MODE INDUCTION VOLTAGE
Filed Oct. 9, 1963
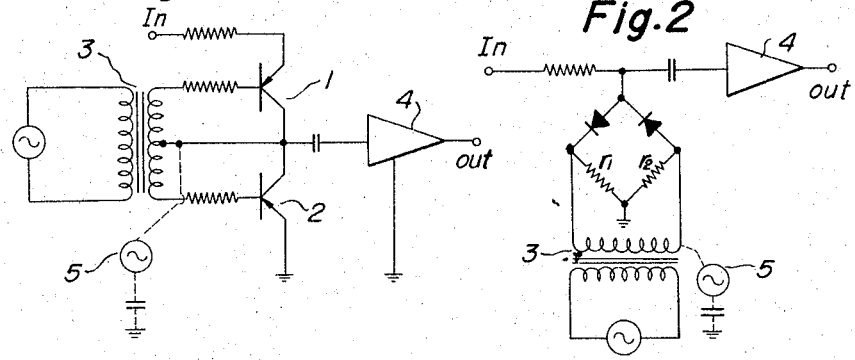
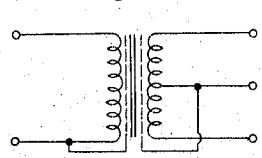
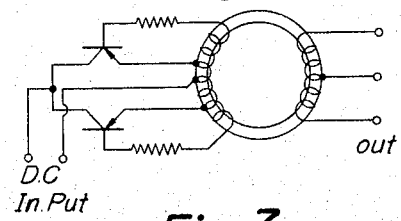
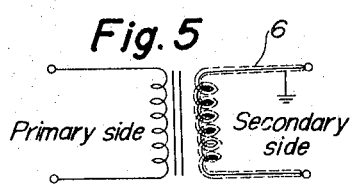
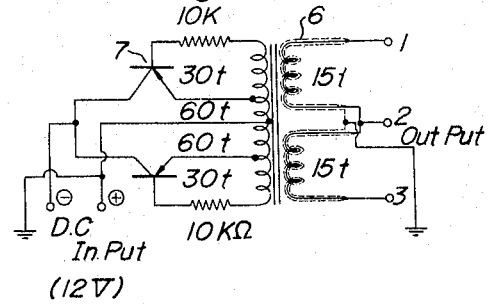
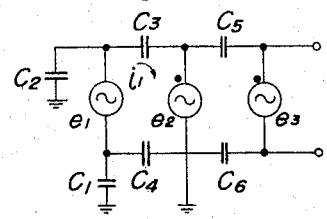
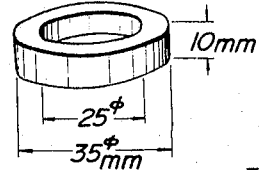
INVENTOR
Fumiyuki Inose
By Paul M. Craig, Jr.
ATTORNEY

United States Patent Office 3,286,153
Patented Nov. 15, 1966

3,286,153
CONVERTER SYSTEM FOR ELIMINATING
COMMON MODE INDUCTION VOLTAGE
Fumiyuki Inose, Hachioji-shi, Tokyo, Japan, assignor to
Hitachi, Ltd., Tokyo, Japan, a corporation of Japan
Filed Oct. 9, 1963, Ser. No. 314,921
Claims priority, application Japan, Nov. 1, 1962,
37/48,313
2 Claims. (Cl. 321—8)

The present invention relates to a novel excitation system wherein a static shielded wire is wound on the secondary side of a transformer disposed in an excitation circuit of an electronic D.C. to A.C. converter or like equipment to thereby wholly eliminate a common mode induction voltage generated in said circuit.

As is commonly known, in a D.C. to A.C. converter or like equipment for mainly converting a low level D.C. voltage (or current) to an A.C. voltage having an amplitude proportional thereto, an offset voltage of the same frequency as the excitation frequency of said converter or like equipment, that is, common mode induction voltage is generated due to a stray coupling existing in the system ranging from an excitation source to a modulation circuit. Therefore, suitable means must be provided to reduce such induction voltage. In mechanical converters, such means can be easily incorporated therein for the purpose of reducing the induction voltage. This can be sufficiently effected by merely providing a well-known electromagnetic or electrostatic shielding means between an excitation circuit and a contact circuit on the signal side of said mechanical converter, because the both circuits can readily be separated electrically and spacially from each other. In a Liston type chopper (D.C. to A.C. converter), for example, an arrangement is generally made to minimize said stray coupling by a mechanical means.

On the contrary, in an electronic D.C. to A.C. converter, such as a transistor chopper, diode chopper, field effect transistor chopper, variable capacitance diode chopper or magnetic modulator, an excitation circuit and a low level circuit on the signal side are coupled together either electrically or magnetically, and the degree of this coupling is considerably greater than that of the mechanical choppers. Such greater extent of coupling presents various undesirable problems in connection with the circuit arrangement thereof. One of the major problems is the appearance of an offset voltage due to common mode induction voltage generated in the excitation circuit as described above.

Therefore, the primary object of the invention is to provide a novel excitation system which is free from such undesirable offset voltage.

According to the invention, there is provided an excitation system operative free from common mode induction voltage comprising an exciting transformer or like equipment having a secondary winding formed of a shielded wire, said shielded wire having a point or terminal of an outer shielding conductor thereof led to a point of common potential.

There are other objects and particularities of the invention which will be obvious from the following description with reference to the accompanying drawings, in which:

FIG. 1 is a schematic diagram showing an excitation system of a conventional electronic D.C. to A.C. converter;

FIG. 2 is a schematic diagram showing an excitation system of another electronic D.C. to A.C. converter of conventional design;

FIG. 3 is a schematic diagram of a conventional excitation transformer of a double shielding system;

FIG. 4 is a schematic diagram of a magnetic multivibrator having a toroidal core;

FIG. 5 is a schematic diagram of an excitation system showing the principle of the invention;

FIG. 6 is an equivalent circuit of FIG. 5;

FIG. 7 is a schematic diagram of an embodiment of an excitation system of the invention; and FIG. 8 is a perspective view of a toroidal core used in the embodiment shown in FIG. 7.

At first, explanation will be given as to occurence of such common mode induction voltage with reference to transistor choppers as shown in FIG. 1. The secondary side of an exciting transformer 3 for transistor choppers 1 and 2 ordinarily has its main capacitance in the form of an internal impedance as indicated by an equivalent circuit shown in dotted line in FIG. 1. Thus, the secondary side of the exciting transformer 3 is at a potential which is floating over the earth potential by an amount of a common mode potential 5. Therefore, at a half period where the transistor chopper 1 is on and the transistor chopper 2 is off, a voltage proportional to said common mode potential will be impressed on an amplifier 4 at the next stage and will become a cause of offset.

FIG. 2 shows an excitation system including diode choppers. In this case, the same thing as above can also be said, though somewhat different depending on the magnitude of resistances $r1$ and $r2$. In any event, generation of an offset voltage proportional to the common mode potential may always be inevitable unless some measures are taken to deal with such undesirable difficulty.

In order to solve the difficulty as stated above, various systems have been proposed heretofore, one of which is shown in FIG. 3. The system shown in FIG. 3 comprises an exciting transformer of a double shielding structure to reduce the common mode potential to a minimum. Any other means so far employed have not been particularly effective. Moreover, according to the system employing such double shielding structure, it is a usual practice to interpose between coils three to four shielding plates which are electrically insulated from each other. Such system is defective in that it is considerably difficult to fabricate said exciting transformer due to its complicated structure.

Especially when a portion of a magnetic toroidal core of a magnetic multivibrator is substituted for said exciting transformer as shown in FIG. 4, extremely complicated procedures are required for the fabrication of shielding therefor and, as a matter of fact, it is almost impossible to provide a multi-layer shielding on such toroidal core. Thus, it has been a matter of impossibility to hope for the elimination of common mode induction voltage in a positive, simple and inexpensive manner when such conventional double shielding method is relied upon (especially in the case of the toroidal core).

This invention has been made to provide a basic solution to deal with such difficulty of the conventional systems. The fundamental constitution of a system according to the invention is shown in FIG. 5, according to which the secondary side of an exciting transformer is wound with an electrostatically shielded wire 6, the outer surface of which is suitably electrically insulated to prevent short circuit from taking place at said secondary side. The shielded wire comprises a core conductor which is utilized to obtain a secondary voltage through electromagnetic coupling to the primary side, while a shielding terminal of the shielded wire is either grounded or led to a point of common potential. With such arrangement, the common mode induction voltage as described in the foregoing can almost completely be removed.

The fundamental function of the system according to the invention will be explained in the following with reference to a simplified equivalent circuit. FIG. 6 shows an equivalent circuit of the exciting transformer shown in FIG. 5. In FIG. 6, $e_1$ designates a voltage at the primary circuit. The primary circuit is considered to be grounded through stray capacitances such as $c_1$ and $c_2$. On the outer shielding conductor of said shielded wire on the secondary side, a voltage $e_2$ is induced. The shielding conductor on the secondary side is equivalently coupled to the primary circuit through stray capacitances $c_3$ and $c_4$. As will be apparent from the foregoing description, the shielding conductor on the secondary side is directly grounded at one point thereof (or one terminal in this case). On the other hand, in the core conductor of said shielded wire, a secondary voltage $e_3$ is electromagnetically induced. Although stray capacitances $c_5$ and $c_6$ are interposed between said core conductor and said shielding conductor, it is apparent that there is no stray capacitances directly coupling the primary winding and the core conductor. It should be further noted that said voltages $e_2$ and $e_3$ have an almost same amplitude and the same polarity in view of the structure of the shielded wire, but there is no such relation between the voltages $e_1$ and $e_2$.

Therefore, a current $i_1$ will flow in the loop of $e_1$–$c_3$–$e_2$–$c_4$ and a voltage drop is caused in the stray capacitance $c_4$, with the result that the primary circuit is at a potential which is floating above the earth potential by an amount of a common mode potential. Since, on the contrary, the voltages $e_2$ and $e_3$ in the secondary side have the same amplitude and polarity, no current flows in the loop of $e_2$–$c_5$–$e_3$–$c_6$. Hence no current flows in the loop. There will be no voltage at the terminals of the stray capacitance $c_6$ and the output terminal stays at the earth potential. Thus it will be appreciated that the desired purpose is accomplished since the output voltage on the secondary side has no component of the common mode induction voltage.

FIG. 7 shows an embodiment of an excitation system according to the invention. In the excitation system shown in FIG. 7, a wound iron core transformer, the core of which has an external shape as shown in FIG. 8, is used to provide a rectangular exciting wave of about one kilocycle in a primary oscillation circuit 7. Two shielded wires of fifteen turns each are wound in a single layer on the secondary side of said iron core and connected at an external point to provide a center-tapped secondary winding. An outer shielded conductor of said shielding wires is grounded at the central point thereof. In this case, the shielded wires having an outside diameter of 1.8 millimeters are used and wound in one layer, which provides a total number of turns of thirty. Then, peak-to-peak voltages of the square wave at six volts each are obtained between terminals 1 and 2, and 2 and 3. In respect of a potential difference between the central point 2 and earth, a common mode voltage is in the order of one volt when the shielding conductor is not grounded, whereas it makes an abrupt decrease to a value in the order of several millivolts when the shielding conductor is grounded as described above. The rate of decrease may be further improved by utilizing the shielded wire having a more complete shielded structure.

The method according to the invention is most adapted for excitation of electronic D.C. to A.C. converters by means of the magnetic multivibrators, especially those provided with the toroidal cores. With the magnetic multivibrators having toroidal cores, a greater secondary voltage per turn will be obtained, and a smaller number of total turns will suffice. Therefore, there is a marked advantage in that the excitation system of small size and light weight can be obtained even with an ordinary shielded wire of an outside diameter in the order of 1.8 millimeters.

From the foregoing description, it will be apparent that the excitation system according to the invention provides an extremely simple means of eliminating the common mode induction voltage which is far superior to the conventional double shielding system and has a better practical effect.

What is claimed is:

1. An excitation system operative free from common mode induction voltage comprising a D.-C. to A.-C. converter circuit designed for operation at sub-radio frequencies, said converter circuit including an output transformer having a toroidal iron core and input and output windings wound thereon and inductively intercoupled, said input winding being formed of a conventional single conductor insulated wire and said output winding being formed of a conventional coaxial shielded wire so arranged that a voltage is electromagnetically induced in the core conductor of said shielded wire by the input winding, and a point on the outer shielding conductor of said output shielded wire is led to a point of common ground potential.

2. The excitation system set forth in claim 1, wherein the input winding is center-tapped and the free ends thereof are connected in balanced relation to the outputs of active elements of the converter circuit, and wherein the core conductor of the coaxial shielded output winding is center-tapped and the free ends of the core conductor are connected in balanced relation to an output circuit, and the grounded common point on the outer shielding conductor is located substantially midway the length thereof.

References Cited by the Examiner
UNITED STATES PATENTS

| | | | |
|---|---|---|---|
| 1,474,382 | 11/1923 | Round | 336—84 X |
| 2,553,324 | 5/1951 | Lord | 336—84 X |
| 3,065,431 | 11/1962 | Geyger | 331—113 |
| 3,066,266 | 11/1962 | Fisher | 336—84 X |
| 3,149,296 | 9/1964 | Cox | 336—84 |
| 3,197,723 | 7/1965 | Dortort | 336—195 |
| 3,244,960 | 4/1966 | Stevens et al. | 321—8 |

JOHN F. COUCH, *Primary Examiner.*

LLOYD McCOLLUM, *Examiner.*

W. E. RAY, *Assistant Examiner.*